Figure 1:
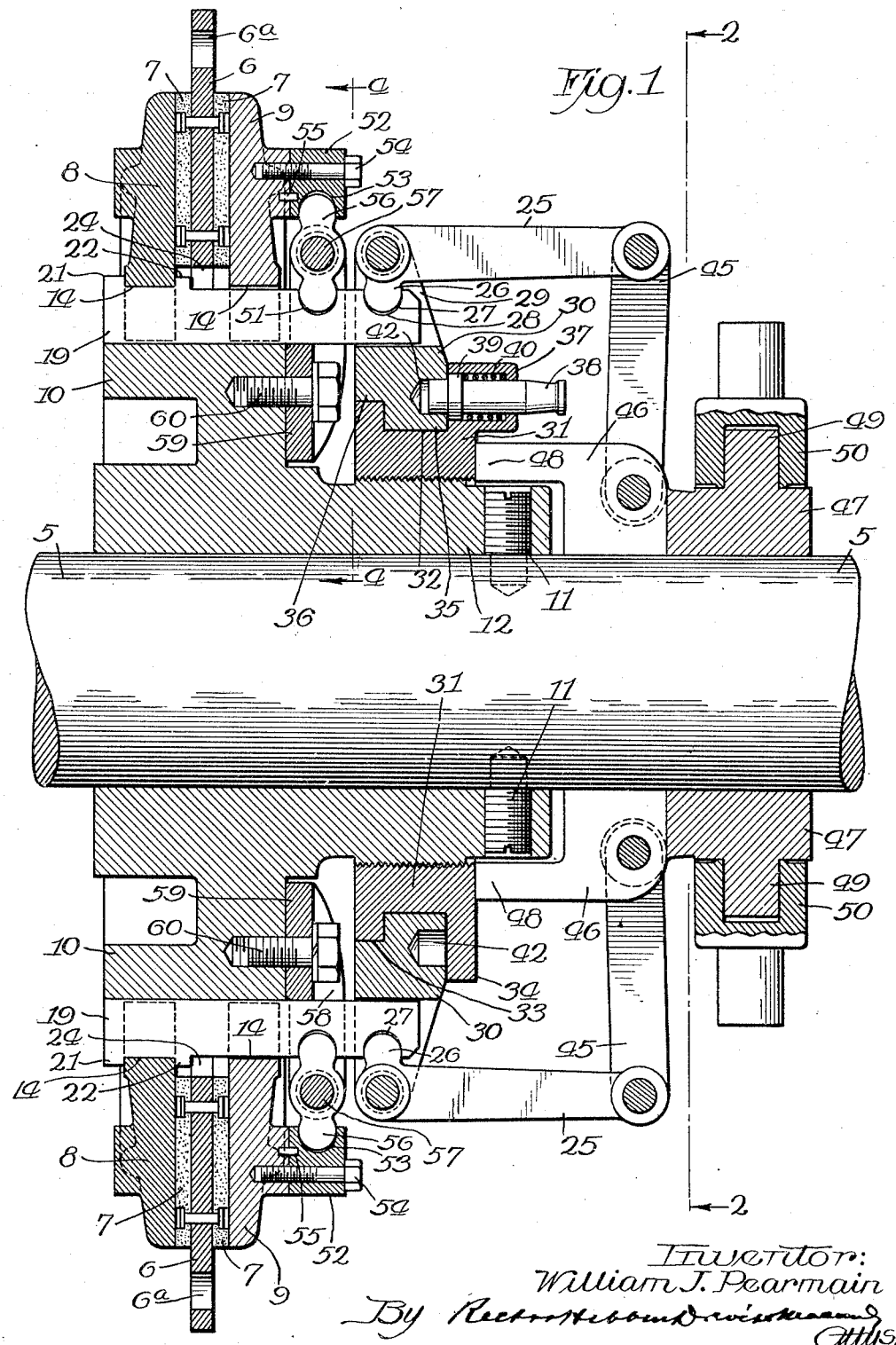

Oct. 15, 1929.　　W. J. PEARMAIN　　1,731,791

CLUTCH

Filed Dec. 12, 1927　　2 Sheets-Sheet 1

Inventor:
William J. Pearmain
By [signature]
Attys.

Oct. 15, 1929.  W. J. PEARMAIN  1,731,791
CLUTCH
Filed Dec. 12, 1927   2 Sheets-Sheet 2

Inventor:
William J. Pearmain

Patented Oct. 15, 1929

1,731,791

UNITED STATES PATENT OFFICE

WILLIAM J. PEARMAIN, OF RACINE, WISCONSIN, ASSIGNOR TO THE TWIN DISC CLUTCH COMPANY, OF RACINE, WISCONSIN

CLUTCH

Application filed December 12, 1927. Serial No. 239,356.

My invention relates to clutches of that type in which an intermediate friction disk is engaged by clamping disks arranged on the respective opposite sides thereof and movable into and out of engagement therewith. The friction disk is commonly attached to the driving member, which may be the flywheel of a motor, and the clamping disks are rotatable with the driven member, and are so shown and described herein, although manifestly this connection may be reversed. My invention provides a clutch of this character in which both of the clamping disks are floating or movable toward and from the intermediate friction disk and in which the clamping disks are positively operated both toward and from the friction disk. It further provides a construction in which adjustment may be readily and quickly made as required or found desirable to take up wear. Other features and advantages of my improved construction will be apparent from the following description and claims.

Figure 2:
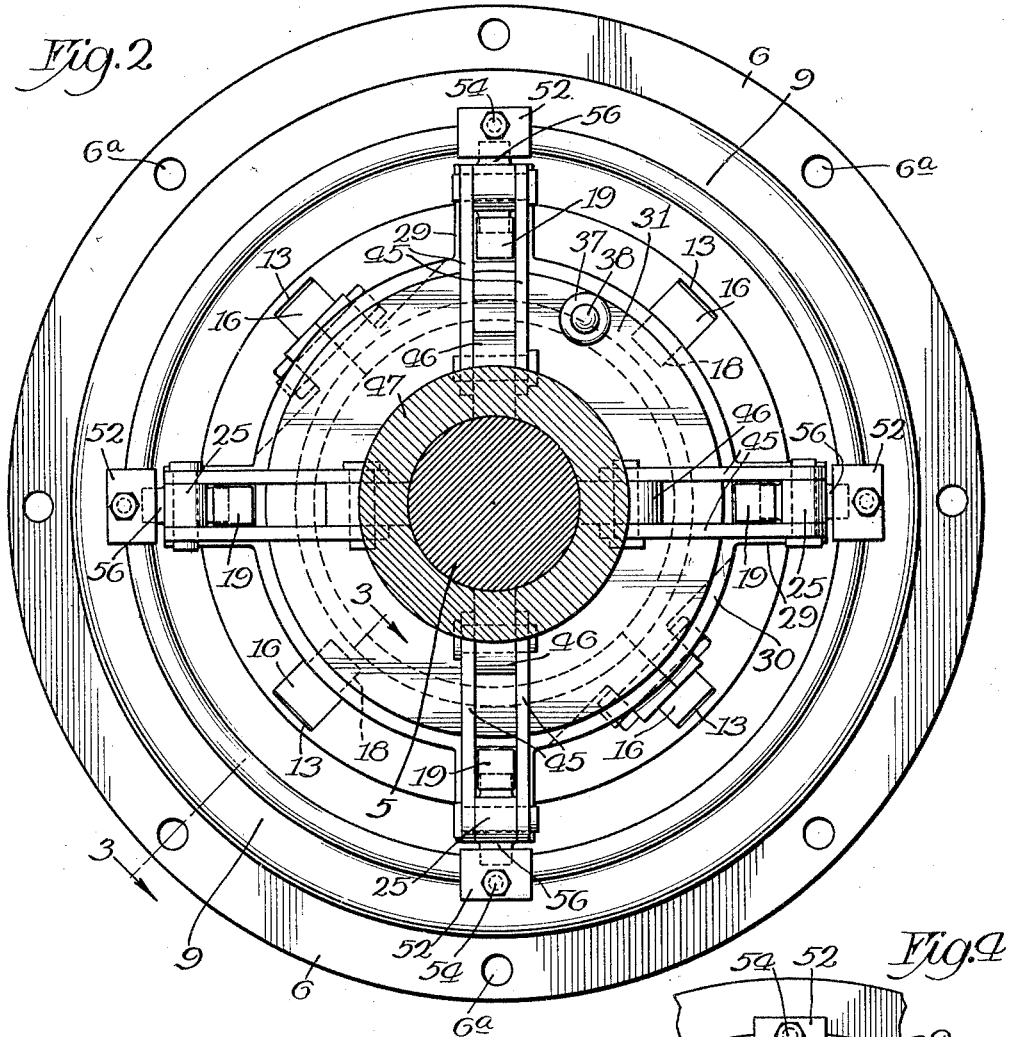
Figure 3:
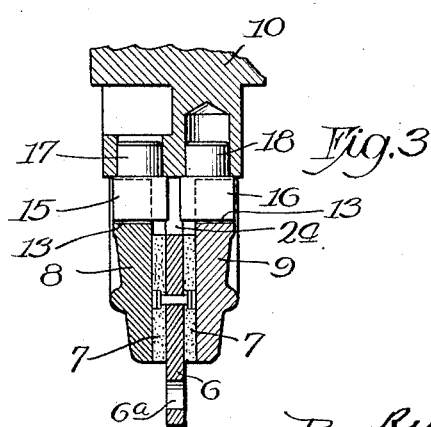

In the drawings accompanying and forming a part of this specification,

Figure 1 is an axial section through a clutch embodying my invention;

Fig. 2 a transverse section on the plane of line 2—2 of Fig. 1;

Fig. 3 a fragmentary radial section on the plane of line 3—3 of Fig. 2; and

Figure 4:
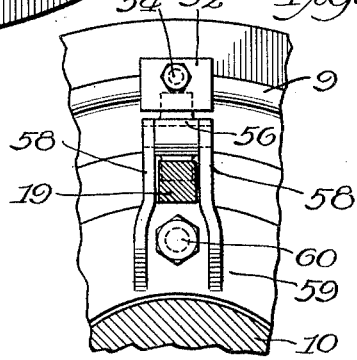

Fig. 4 a fragmentary transverse section on the plane of line 4—4 of Fig. 1.

Each part is identified by the same reference character wherever it appears in the several views.

Referring to the drawings, 5 is a shaft to be connected to and disconnected from another co-axial rotary member by means of my improved clutch. It will be referred to hereinafter as the driven shaft. The friction disk 6 is shown as provided with bolt holes 6ª by which it may be secured to the flywheel of a motor or other rotary part. The disk is provided as usual with friction facings 7. On opposite sides of the friction disk are the clamping disks 8, 9, which may be and are shown as identical in construction and interchangeable. They are keyed upon and have a slight axial movement relative to a hub 10 mounted upon the shaft 5. The hub is shown as secured to the shaft by screw pins 11 extending through the reduced end 12 of the hub.

In the exemplification of my invention shown, the clamping disks 8, 9 have a sliding fit upon the portion of the hub of larger diameter and are formed on their inner periphery with keyways 13, 14. The hub is provided with four keys 15 for engagement with alternate keyways 13 of the clamping disk 8 and with four keys 16 for engaging with alternate keyways of the clamping disk 9. The keys 15, 16 are secured in position on the hub by means of dowels 17, 18 thereon respectively entering corresponding bores in the hub. The keys and keyways are rectangular in cross section, the keyways having a sliding fit upon the keys so that the clamping disks may readily slide the required distance axially on the keys and the hub, but are compelled to rotate therewith.

The intermediate keyways 14 on the disks receive the operating keys or slides 19. Keys 19 are likewise rectangular in cross section and preferably fit snugly into the keyways 14 of the clamping disk 8 and are formed with outwardly extending lugs 21, 22 which engage over the respective outer and inner faces of the clamping disk 8, so that said disk moves axially with said slides or actuating keys. The keys are slightly reduced in cross section where they pass through the keyways 14 in the clamping disk 9 so as to move freely therethrough, and it will be noted that the center opening 24 of the disk 6 is of a size to permit the movement of the keys 19 without interference therewith. The keys 19 are given their sliding movement by means of bell crank levers 25, the shorter arms 26 of which are cylindrical at their ends at 27 to engage correspondingly shaped seats 28 in the ends of said sliding keys. The bell crank levers are fulcrumed in pairs of lugs 29 projecting radially from a fulcrum ring 30. The latter is seated upon a collar 31 which has a screw-thread engagement with the reduced end 12 of the hub so that by turning said collar it may be adjusted axially of the hub. The collar 31 is formed with an annular groove 32 and inner and outer flanges 33, 34. The outer portion 35 of the fulcrum ring is of less internal diameter and fits within the groove 32. The inner portion 36 of the fulcrum ring is of somewhat larger internal diameter and surrounds the flange 33. The fulcrum ring is formed in two sections which are bolted together about the collar 31. The fulcrum ring is formed with a housing 37 in which is received a locking pin 38 which is reciprocable in said housing and formed with a flange or enlargement 39 sliding in the housing and between which and the end of the housing is a spring 40 which normally forces the pin inwardly or toward the fulcrum ring 30. The latter is provided with a series of pits or holes 42 extending circumferentially thereof and adapted to receive the end of the locking pin. Obviously the collar 31 and the fulcrum ring 30 carried thereby may be adjusted axially of the hub by rotating the collar and may be locked in adjusted position by the engagement of the pin 38 with one of the holes in the fulcrum ring. The latter, of course, is prevented from turning by the engagement therewith of the actuating keys or slides 19 which extend between the lugs 29 of respective pairs on the ring.

The longer arms of the bell crank levers 25 are connected at their ends by pairs of links 45 with lugs 46 on a sliding actuating collar 47 surrounding the shaft 5. The lugs 46 are prolonged as at 48 to make contact with the collar 31 and thus limit the movement of collar 47 toward the left as seen in Fig. 1. The construction is such that the links 45 may just pass the dead center when the collar 47 is moved toward the left. Collar 47 is shown as formed with a flange 49 to receive the trunnion ring 50 upon which the clutch actuating fork operates in the usual manner.

It has been explained how the slides or actuating keys 19 operate the clamping disk 8. They likewise operate the clamping disk 9, but in the opposite direction, that is to say both disks 8 and 9 approach and recede from the intermediate friction disk at the same time. For this purpose, each sliding key is formed with a cylindrical seat 51 in its outer face and the clamping disk 9 is provided in radial alignment with each key with a seat block 52 in the inner face of which is formed a semi-cylindrical seat or cavity 53. The seat block is secured to the disk by a bolt 54 and prevented from turning about the bolt by a dowel pin 55. A lever 56 with cylindrical ends is pivoted between each sliding key and the corresponding seat block and the rounded ends of the lever engage the seats in the key and block respectively. The levers are fulcrumed on pins 57 carried by pairs of lugs 58 extending radially outward from ring 59 bolted to the hub at 60. Obviously, when the sliding keys are moved to the left (as seen in Fig. 1), the clamping disks 8 and 9 are moved away from the intermediate friction disk, the disk 9 being moved through the levers 56 just mentioned; and when the sliding keys are moved to the right, the clamping disks are caused to engage the intermediate friction disk.

The engagement and pressure of the clamping disks on the intermediate friction disk may be readily adjusted without disassembling the device by merely pulling out the locking pin 38 and revolving the collar 31 to the required extent. The clamping disks are interchangeable, and to provide for a single size of clutch, it is necessary to keep in stock only the one form of clamping plate. If it is desired to provide greater or less engaging surface between the friction disk and the clamping disks, it is only necessary to substitute clamping disks and a friction disk of greater or less external diameter, the other parts of the clutch remaining unchanged.

I claim:

1. In a clutch of the class described, a hub adapted to be attached to a shaft, a pair of clamping disks keyed to the hub for revolution therewith, but having a limited movement axially thereof, a friction disk intermediate said clamping disks and adapted for connection to a rotary part, actuating keys on the periphery of the hub and movable axially thereof and directly engaging one of the clamping disks, there being bearing seats on the other of said clamping disks, levers intermediate said actuating keys and the respective bearing seats, and means for reciprocating said keys.

2. In a clutch of the class described, a hub adapted for attachment to a shaft, a pair of clamping disks keyed to the hub for revolution therewith, but having a limited movement axially thereof, a friction disk intermediate said clamping disks and adapted for connection to a rotary part, actuating keys on the periphery of the hub and movable axially thereof and directly engaging one of the clamping disks, there being bearing seats on the other of said clamping disks, and bearing seats formed in said keys, levers engaging at their respective opposite ends the seats in the actuating keys and on the clamping disk, bearing seats formed in the ends of said actuating keys, bell crank levers having arms engaging the last mentioned seats, and means for swinging the bell crank levers.

3. In a clutch of the class described, a hub adapted for attachment to a shaft, a pair of clamping disks keyed to the hub for revolution therewith, but having a limited movement axially thereof, a friction disk intermediate said clamping disks and adapted for connection to a rotary part, actuating keys on the periphery of the hub and movable axially thereof and directly engaging one of said clamping disks and extending through the other, there being bearing seats formed in said actuating keys and bearing seats on the other of said clamping disks, levers fulcrumed intermediate each seat on an actuating key and a corresponding seat on the clamping disk and engaging said seats at their opposite ends, bell crank levers having arms engaging the respective actuating keys, a fulcrum ring on which said bell crank levers are pivoted, a collar on which the fulcrum ring is seated and with respect to which it is revoluble, said collar having a threaded engagement with the hub, means for locking said collar against rotation, and means for actuating the bell crank levers.

In testimony whereof, I have subscribed my name

WILLIAM J. PEARMAIN.